United States Patent [19]

Sollars

[11] Patent Number: 4,982,698

[45] Date of Patent: Jan. 8, 1991

[54] ANIMAL OPERATED FEEDER

[76] Inventor: Herbert M. Sollars, 433 Kathryn St., Washington Court House, Ohio 43160

[21] Appl. No.: 83,065

[22] Filed: Aug. 10, 1987

[51] Int. Cl.$^5$ .............................................. A01K 5/00
[52] U.S. Cl. ..................................................... 119/54
[58] Field of Search ...................... 119/52 A, 52 R, 53, 119/53 S, 54; 222/544, 511, 547, 457, 449, 450, 451

[56] References Cited

U.S. PATENT DOCUMENTS

| | | | |
|---|---|---|---|
| 338,761 | 3/1886 | Milliken | 119/53.5 |
| 973,359 | 10/1910 | Lima | 222/565 |
| 1,082,327 | 12/1913 | Henvis | 222/450 |
| 1,378,533 | 5/1971 | Fitz Gerald | 119/52 R |
| 1,398,041 | 11/1921 | Pfeifer | 119/52 R |
| 1,569,990 | 1/1926 | Lovering | 119/54 |
| 2,230,460 | 1/1938 | Kleinwachter | 222/457 |
| 2,397,610 | 4/1946 | Lennon | 222/457 |
| 2,746,423 | 5/1956 | Runion | 119/52 R |
| 3,035,545 | 5/1962 | Mayo | 119/52 R |
| 4,180,014 | 12/1979 | Mathews | 119/52 R |
| 4,825,811 | 5/1989 | O'Kelley | 119/54 X |

FOREIGN PATENT DOCUMENTS

| | | | |
|---|---|---|---|
| 134973 | 10/1946 | Australia | 119/53.5 |
| 154209 | 1/1952 | Australia | 119/51 |
| 692658 | 6/1940 | Fed. Rep. of Germany | 119/54 |
| 196658 | 12/1955 | Fed. Rep. of Germany | 119/53.5 |
| 1344249 | 10/1963 | France | 119/52 R |
| 2560001 | 8/1985 | France | 119/52 R |
| 0650578 | 3/1979 | U.S.S.R. | 119/56 R |

Primary Examiner—Robert P. Swiatek
Attorney, Agent, or Firm—Jerome P. Bloom

[57] ABSTRACT

Animal operated feeder comprising a vertically extended holding bin having a shallow feeding tray spaced below and projected forwardly of its bottom. The bin includes a dispensing outlet normally sealed by a closure device a portion of which projects therefrom, over and in vertically spaced relation to a rear portion of the tray. The bin also incorporates baffle structure which underlies and carries the major portion of the weight of the feed load and defines within the bin, at a location offset and vertically displaced from the dispensing outlet, a restricted opening for feed to move thereby to an uppermost portion of the upper surface of a downwardly inclined baffle plate immediately thereunder which supports and directs the amount of feed which it receives along its length, which extends to a point adjacent and spaced from the vicinity of the dispensing outlet where a lower end portion thereof defines a limited passage for feed to move thereby to this outlet. This construction and arrangement insures that only a small amount of feed will flow from the bin each time a dispensing thereof is triggered by a feeding animal. As illustrated, the last mentioned baffle plate is preferably hingedly connected to the bin and arranged to have a dependent end portion thereof bear on and move with the closure device to limit its displacement from its sealing relation to the bin outlet and restrict the amount of feed dispensed in any instance by a feeding animal.

10 Claims, 1 Drawing Sheet

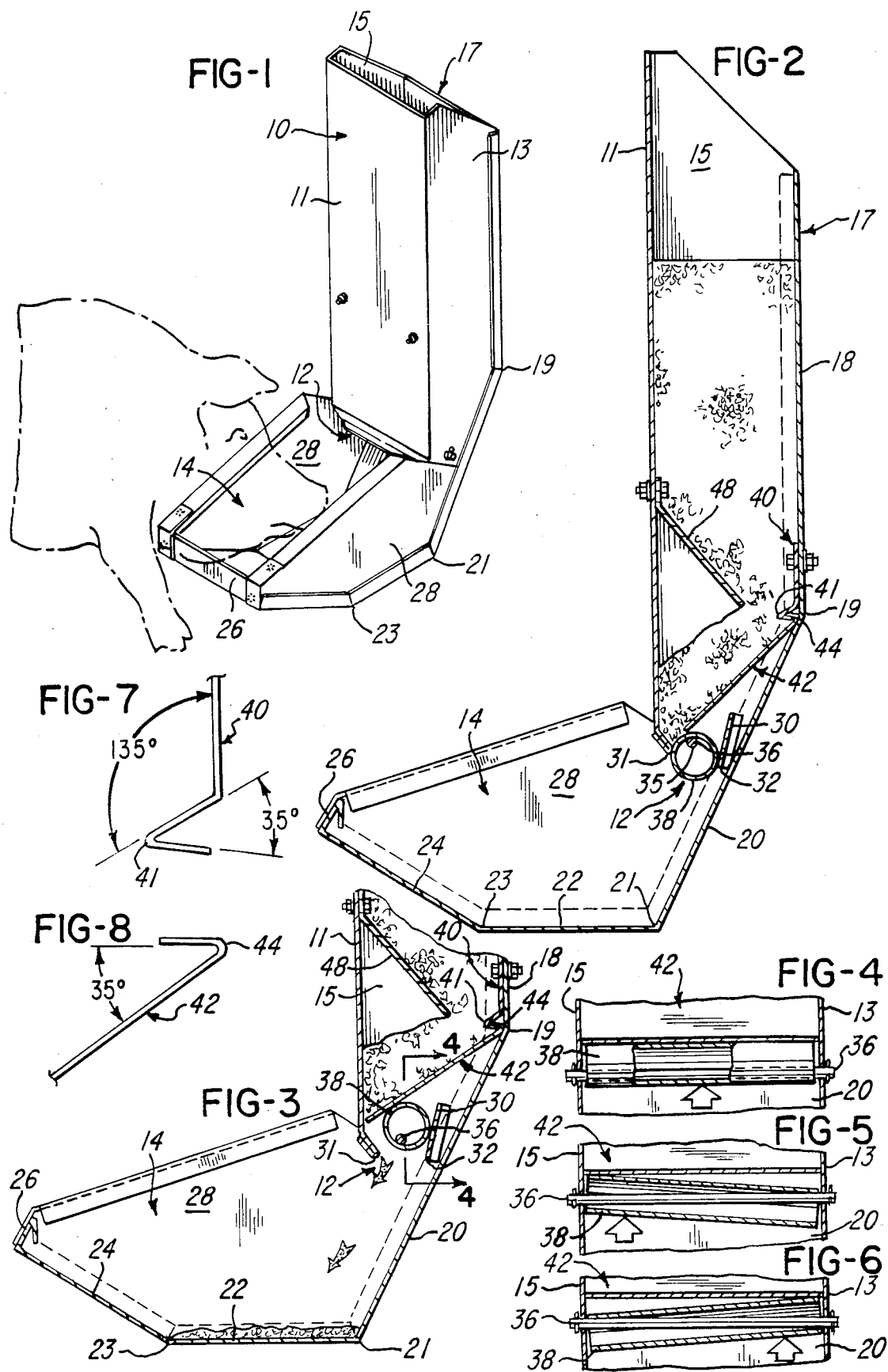

ANIMAL OPERATED FEEDER

BACKGROUND OF THE INVENTION

This invention relates to animal feeders and more particularly to animal operated feeders highly advantageous for use in feeding sows, boars and pigs, which have a simplistic but nevertheless substantially improved construction that renders them more versatile and more efficient and satisfactory in use than those feeders which constitute the prior art. It will therefore be herein described in this context and with particular reference to an embodiment thereof which provides a new and substantially improved animal operated, roller type, farrowing crate sow feeder.

Embodiments of this invention have proven in tests to virtually eliminate or substantially reduce a number of problems, such as the following evidenced in use of feeders of the prior art for similar purposes:

(a) Animals find difficulty in their operation;
(b) They are limited as to the type and consistency of feed which they can handle;
(c) They have a frequent incidence of malfunction and lack of uniformity in their dispensing operations;
(d) There is often considerable waste and spoilage of feed attendant their use which significantly enlarges the costs of feeding and their maintenance requirements; and
(e) In many instances they impose uncomfortable conditions on the feeding animal. All such problems are substantially reduced and virtually eliminated in use of embodiments of the present invention.

Neither the present inventor nor anyone substantively involved in the present disclosure is aware of any prior art specifically pertinent to the novel features of the invention herein set forth. The general state of the prior art is believed to be exemplified by feeders of O'Kelley Mfg. of Shelbyville, Ill. and Farmweld of Teutopolis, Ill.

SUMMARY OF THE INVENTION

Embodiments of the present invention basically provide an animal feeder which may be comfortably operated and used, particularly by a sow, boar, pig or like animal.

Each thereof features a vertically extended holding bin so constructed and arranged that it facilitates an easy triggering of a flow of feed therefrom, even by an animal such as a small pig, and includes means effective to insure that such flow is virtually a measured flow and, that only a small amount of feed will flow therefrom each time a dispensing thereof is triggered by a feeding animal.

Said vertically extended holding bin, in its broadest context, has means therein which effectively define two holding sections for such feed as is delivered thereto and passed therethrough. In this respect it should be pointed out that, contrary to prior art animal operated feeders which in general are limited as to the consistency, particle size and/or type of feed which they can store and dispense, embodiments of the present invention have considerable versatility in this respect. More particularly, the bin is arranged to have an upper and a lower holding section and the upper section thereof occupies in the neighborhood of 90% of the total vertical extent of the bin and has a capacity to hold and distribute the weight of essentially a full load of feed, the amount of which is sufficient for numerous feedings.

By contrast the lower section of the bin is relatively shallow and so constructed, even in a "filled" condition of the bin, to contain a relatively shallow layer of feed which is inherently moved thereto by way of a restricted access opening from the upper section. This shallow layer of feed, as normally applied overlies means defining a normally sealed outlet provided at the bottom of the bin. The sealing means for said outlet includes means which bridges said outlet, a portion of which is normally projected therethrough and outwardly of said bin at a location where it is readily acessible to an animal, which by means of its nose may easily engage and move said sealing means, at least in part, from its sealing relation to said outlet, whereupon a limited amount of feed, the quantity of which is quite small, will issue from the lower section of said bin. The ease with which an animal, even a small pig, can operate this feeder is insured by the fact that only an insignificant portion of the weight of the feed within the bin reaches and exists in the vicinity of said outlet at any given time, even when the bin is fully loaded.

In preferred embodiments the means for defining the respective upper and lower sections of said bin include a pair of vertically displaced, relatively offset and partially overlapped baffle plates. The uppermost portions of said plates are fixed respectively to what may be considered a front wall portion and a rear wall portion of a generally tubular wall structure which defines the vertical extent of the bin. The means defining the bottom of the holding bin, including its normally sealed outlet are located adjacent the lowermost baffle plate. From the points of their respective connections to front and back wall portions of the bin, the levels of which are vertically spaced, the respective baffle plates, which bridge the side wall portions of the bin, are each arranged to be downwardly inclined and sloped as they project toward and at their lowermost ends terminate adjacent but short of the opposite wall portion of the bin.

The construction and arrangement of said pair of baffle plates is such that the lowermost end of the upper thereof defines a restricted discharge opening from the upper holding section of said bin adjacent the back wall thereof. This opening is directly above and relatively closely adjacent to the uppermost surface portion of the lower of said pair of baffle plates. The lower baffle plate is immediately of the back wall portion of the bin at a level which is below and in spaced relation to the lowermost limit of the upper baffle plate. At the same time the lower of said baffle plates angles downwardly from its connection to the back wall portion of said bin to the vicinity of the bin outlet to define with the lowermost limit of said upper baffle plate and the peripherally bounding portions of the bin wall structure a very limited holding section of the feed bin and a restricted area for feed to move from the upper holding section of the bin, past the lowermost limit of the upper baffle plate, in a shallow layer, to the normally sealed bin outlet. The relative angularity of the baffle plates and the limited space defined between the lowermost edge of the upper of said pair of baffle plates and an upper surface portion of the lower of said pair of plates adjacent the back wall portion of said bin prescribes the very limited nature of the amount of feed which will be present within the lower section of the bin at any given time.

In the preferred embodiment illustrated the sealing means for said outlet includes a cylindrical member coextensive with and in bridging relation to the means defining said outlet which is so configured and mounted as to have freedom of motion with respect to said outlet. Preferably, also, in embodiments which utilize a pair of baffle plates such as above described, the lower of said baffle plates will be simply and effectively hingedly connected to the back wall portion of said bin from which it extends to normally bear on and overlie said cylindrical member and move therewith in a closely adjacent relation to the front wall portion of the bin, in a path to almost immediately abut said front wall portion and have its movement limited thereby to insure the amount of feed dispensed from said bin on any occasion of a displacement of said sealing means from said outlet will be small.

Embodiments in their illustrated preferred form also feature a shallow feeding tray integrated with and forming an extension of the back wall of the bin which is offset with respect to and projected in the main to extend forwardly of the front wall of the bin, lending both comfort and ease of operation of such an embodiment of the invention.

In an especially advantageous form of the bin the transverse cross section of the first mentioned tubular wall portion of the bin will be rectangular in configuration and the opening for introducing feed to the bin will be formed to face upwardly and to the rear of the bin.

As will be seen, the invention embodiments are simplistic as to their construction and function and so designed to be highly versatile as to their application and to minimize normally required maintenance in feeding animals while at the same time minimizing waste and spoilage of feed and insuring a proper diet for the feeding animals.

It is therefore a primary object of the invention to provide animal operated feeders particularly advantageous for use in feeding sows, boars, pigs and the like which are relatively economical to fabricate, most efficient and satisfactory in use, adaptable to a variety of applications and unlikely to malfunction.

Another object is to provide animal operated feeders, preferably of a roller type, but not limited thereto, particularly advantageous for use in feeding sows, boars, pigs and the like, capable of readily accommodating a wide range of consistency, particle size and type of feed and so designed as to insure that only a small amount of feed is dispensed from the feeder in each instance that the release mechanism of the feeder is operated by an animal.

Another object is to provide improvements in animal operated feeders enabling individualized, easily, and positively controlled and comfortable self feeding of animals such as sows, boars and pigs virtually without waste and spoilage of feed while minimalizing the requirement for maintenance procedures in this connection as well as the cost thereof.

A further object of the invention is to provide new and improved animal operated feeders possessing the advantageous structural features, inherent meritorious characteristics and means and mode of operation such as herein described.

With the above and other incidental objects in view as will seen and comprehended from the present specification thereof, the invention intended to be protected by Letters Patent consists of the features of construction, the parts and combinations thereof, and the mode of operation as herein described or illustrated in the accompanying drawings, or their equivalents.

Referring to the drawings wherein is shown one but obviously not the only form of embodiment of the present invention.

FIG. 1 is a perspective elevational view of a feeder unit in the form of a preferred embodiment of the present invention;

FIGS. 2 and 3 are vertical sectional views illustrating details of the feeder of FIG. 1 and demonstrating the respective conditions and positions of elements thereof when the feeder is respectively in its normally sealed condition and at that point where an animal triggered dispensing of feed is inherently terminated;

FIGS. 4, 5 and 6 illustrate, partly in section, various positions to which the means which normally bridges and seals the dispensing outlet of the bin of said feeder may be moved by an animal seeking to trigger a dispensing of feed for its consumption; and FIGS. 7 and 8 respectively show fragmentary side elevations of the hinge plate and agitator plate of the invention apparatus which interrelate in the course of the movement of the latter to serve its intended function.

Like elements are identified by like numerals throughout the accompanying drawings.

The embodiment of the invention illustrated in the accompanying drawings may be most advantageously used as a farrowing crate sow feeder which, as shown, is designed for the convenience of a single animal and generally vertically oriented in use. It comprises a vertically extended feed bin 10 which has an integrally connected feeding tray 14 in underlying vertically spaced, forwardly offset relation to its bottom 12.

The vertical extent of the bin 10, and correspondingly its peripherally bounding walls, is defined by a tubular structure which in this instance is preferably made of sheet metal and formed to be generally rectangular in horizontal section to provide it with a front wall 11 integrated with the lateral extremities of which are identically configured, perpendicularly related, rearwardly projecting side walls 13 and 15 which are parallel and have their vertically oriented projected extremities bridged by a back wall 17.

The length of the sheet material which forms the back wall 17 is greater than that of front wall 11 and side walls 13 and 15 and its upper edge is so positioned as to be vertically offset from and to lie substantially below and in a parallel spaced relation to the level of the upper edge of the front wall. Particular note should be taken of the fact that the upper edges of the side walls 13 and 15 are identically cut back from points adjacent and equidistantly spaced from the upper edge of the front wall 11 to smoothly extend and slope downwardly therefrom and merge with the lateral extremities of the upper edge of the back wall 17.

The upper extremity of the tubular configuration of the bin 10 so defined frames an upwardly and rearwardly facing inlet opening at the top thereof which facilitates the introduction thereto of animal feed in a relatively easy, quick, and clean manner.

As will be seen from the drawings, the length of the sheet of material which forms the back wall 17 includes an extension thereof beyond that required for this purpose and is divided, from top to bottom, into sections 18, 20, 22 and 24 by sucessive transversely extending, parallel, longitudinally spaced bends 19, 21 and 23 in the body thereof. Such bends define limits of said sections, facilitate the construction of the tray 14 and contribute to the improvements of the invention exemplified in the preferred embodiment thereof herein illustrated.

The section 18 which provides the uppermost portion of the back wall 17 is parallel to the front wall 11. Its lowermost limit is defined by the horizontal line of the bend 19 the level of which is relatively adjacent but spaced well above the level of the lowermost edge of the front wall 11. The bend 19 provides that section 20 has an angular departure from the plane of section 18 causing it to incline forwardly and downwardly therefrom to have the lower limit thereof, defined by the bend 21, positioned substantially directly below and in vertically spaced relation to the front wall 11 and approximately in the plane of its vertical extent. An upper portion of the vertically inclined extent of the section 20 serves as the lower portion of the back wall 17 of the bin while its lower portion provides the back wall portion of the tray 14. The bend 21 provides that the next section 22, which is relatively short in length, is horizontally disposed to create the base portion of the tray. Beyond the bend 23 the final section 24, which is also short in length, inclines upwardly from the plane of said base portion at an angle to a horizontal which does not materially exceed 30 degrees and includes a very short terminal portion 26 which is first bent inwardly at a right angle to the direction of the section 24 and then has its outermost edge portion reversely bent to present a smooth non-cutting upper edge thereon to an animal approaching the tray.

As will be seen from FIGS. 2 and 3, the sides 28 of the tray 14 are defined by sections of sheet material connected and integrated with the lateral edges of the sections 22 and 24 and lower portion of the section 20 and the upper edge portions thereof which slope upwardly from the very shallow forward extremity of the tray to a level slightly above the bottom of the bin and to either side thereof are rolled so as to avoid cutting or bruising of the animal which is feeding from the contents of the tray. Note that the slope of section 24 which defines the forward wall portion of tray 14 is so shallow that it is virtually an extension of the base portion 22 and together therewith positions forwardly of the bin 10.

Note further that in the embodiment illustrated bin 10 has its dispensing outlet positioned immediately of its front wall 11 and over a mid portion of the forwardly and downwardly sloped surface of the back wall of the tray 14. As a consequence, any feed dispensed from the bin will inherently deposit on the sloping back wall of the tray and be induced thereby to immediately move to and spread across the base 22. The result is a layered deposit of such feed across the base of the tray. As will be seen, the configuration and position of the tray with respect to the bin and the accessible, convenient position of the closure means which normally seal the dispensing outlet of the bin and the ease with which the latter can be moved, at least in part, from the dispensing outlet by an approaching animal contributes greatly to the comfort, well being and welfare of any sow, boar, small pig or like animal in its self feeding process. This is above and beyond the other enumerated and obvious benefits which accrue to farmers using embodiments of the invention for the purpose described.

A very short portion of the length of front wall 11 including its lowermost extremity is bent immediately outward and upward and back on and against a very short portion of the front wall immediately thereabove and together therewith bent inwardly to form with the inner surface of the front wall immediately thereabove an obtuse angle in the neighborhood of 135 degrees, with the inwardly projected extremity thereof defining (FIG. 3) the forward lip 31 of a dispensing outlet at the bottom of the bin which extends from side to side thereof.

Fixed transversely of bin 10, and bridging to its side walls and at a level immediately adjacent the vertical mid point of the section 20 of the back wall 17, is a relatively narrow guide plate 30. The lowermost edge 32 of the forward surface of plate 30 is substantially opposite and spaced to the rear of lip 31 to define therewith said dispensing outlet and, in particular, the rear lip thereof. Note that the front to rear dimension of the bin is substantially reduced at its bottom by reason of the angular disposition of the section 20 with reference to section 18 and front wall 11. Further attention is directed to the fact that while the lower end of the guide plate 30 abuts and has a fixed relation to the section 20 of back wall 17, above its lower edge the plate 30 is angled forwardly and away therefrom to have its forward surface approach but fall short and modestly incline away from a plane parallel to that of the wall 11. At the same time the facing surfaces of the inwardly bent lower end portion of the front wall 11 providing the lip 31 and the guide plate 30 are arranged to converge in the direction of that portion of the wall section 20 which forms the back wall portion of the tray 14.

Each of the side walls 13 and 15 of bin 10 has therein an identically located aperture 35 which is positioned between the lower end portion of the front wall 11 and the guide plate 30, above and in an adjacent spaced relation to the dispensing outlet of bin 10, the lateral limits of which outlet are defined by the side walls 13 and 15 and the fore and aft limits by the lips 31 and 32. A rod 36 projected through the apertures 35 to position in bridging relation to the side walls 13 and 15 and be supported thereby with its respective ends projected outwardly thereof is in the process of its application passed through a tube element 38 which is positioned between said side walls. The inner diameter of tube 38 is substantially larger than the outer diameter of rod 36 and while the length of said tube is such to almost bridge the space between said side walls it is sufficiently short thereof to not only enable the tube to have a very modest degree of axial movement between said side walls but also a degree of radial and angular movement thereof, within the limits of its inner diameter, with reference to said rod and the bounding side walls 13 and 15 (FIGS. 2 and 4–6). Once rod 36 is suitably applied to mount tube 38 between the side walls of bin 10, suitable means are then applied to the respective end portions of the rod which project outwardly thereof to fix the rod in place and restrain its axial displacement from the bin. As so applied tube element 38 will normally have the length thereof supported on and in bearing relation to the rod 36 and consequently have the major portion of the body thereof depend therefrom and by virtue of its outer diameter depend between and in bearing relation to the lip 31 of the front wall 11 and the lip 32 of the guide plate 30, thereby to normally close what constitutes the feed dispensing outlet of the bin 10.

Fixed to and transversely of the lower portion of the section 18 of the back wall 17, on a horizontal line, to extend from side to side of the extent of its inner surface, is a hinge plate 40 which is planar in configuration except for its lowermost edge portion 41 which is bent into a substantially V-shape. The shape and disposition of this "V" is such that the apex thereof positions outwardly from and forward of and parallel to the back wall section 18. The line of said apex, which extends in bridging relation to the side walls 13 and 15, is adjacent and parallel to the line of the bend 19 while the lowermost leg of said "V" shape, which is shorter than the upper thereof, terminates short of and in spaced parallel relation to the line of the bend 19 and in a horizontal plane commonly occupied thereby. The angle defined by and between the legs of the V is preferably kept in the neighborhood of 35 degrees, the same being substantially optimal for the use intended. As thus provided the lower edge of the plate 40 defines a hook the open portion thereof faces the inner surface of the lower end portion of the wall section 18 and is coextensive therewith.

Hingedly connected with and in a pivotal relation to the plate 40 is an agitator plate 42 which, as will be seen, serves as a baffle plate. As seen in FIG. 2, at such time the dispensing outlet is closed, plate 42 projects forwardly and downwardly from the plate 40 to have a portion thereof adjacent its projected extremity overlap and bear on a portion of tube 38 immediately beyond the surface portion thereof uppermost at this time. At this point the projected extremity of plate 42 is in an adjacent relatively closely spaced relation to the lip 31 and the general plane of the the front wall 11, but its spacing from the latter is slightly greater.

It should be noted that plate 42 has a planar configuration except for that edge portion thereof by means of which it is coupled to the plate 40. Such edge portion, which is a very short portion of its front to rear length, is bent back to position at a 35 degree angle with reference to the general plane of the remainder thereof to provide thereon a "V" shaped hook 44 the shape of which is complementary to that of the hook defined by the V-shaped portion 41 of hinge plate 40. As will be seen in FIGS. 2 and 3, in assembly of plate 42 with hinge plate 40, the bent back portion of hook 44 the lateral extent of which equals that of hook 41 is inserted in the open end of the "V" of hook 41, by means of which it is hingedly coupled thereto.

A second baffle plate 48, which extends from side to side of the inner surface of the bin 10, has a horizontally oriented upper edge portion thereof abutted and fixed to the inner surface of the front wall 11 at a level above and in a vertically spaced spaced relation to that of the uppermost extremity of the baffle plate 42. The remainder of plate 48 is angled rearwardly, downwardly and outwardly from the wall 11 in the direction of the the lower portion of the back wall 17 in a plane which if extended would interest the plate 42 in a line adjacent, spaced from and parallel to its hinge line. However, note that its rearwardly projected lower limit is at a level immediately above the level of the lower end of hinge plate 40 and therewith, as laterally bounded by side walls 13 and 15, defines a restricted opening from what contitutes an upper section or upper chamber of the interior of the bin 10. Particular attention is directed to the fact that said upper section of the bin occupies by far the majority of the vertical extent of the bin and has a capacity to contain substantially a full load of feed by virtue of the use of the baffle plate 48, the latter not only defines a restricted opening through the bottom of said upper section but also serves, with the wall structure of the bin above the level thereof to contain and support by far the major portion of the weight of the feed within said section. At the same time the lowermost edge of plate 48 is in closely spaced relation to the upper portion of the plate 42 and in a plane normally substantially perpendicular thereto. The arrangement is such that on any occasion of movement of an obviously limited amount of feed through said restricted opening to drop from the upper to the lower section of bin 10, which is relatively shallow, the lower end of plate 48 is effective to meter and determine that feed which moves thereby will slide down and cover the plate 42 in a very shallow layer which is inherently substantially maintained to the lower end of front wall 11 and the vicinity of the dispensing outlet of the bin where it will overlie that portion of the tube 38 which blocks and normally closes said outlet.

The above remarks have been referenced to a condition wherein the bin 10 is loaded with feed to serve its intended purpose. When a sow, boar, pig or like animal, even one which is relatively small, approaches the described feeder, it will find an individualized unitized structure wherein there is ease and comfort in moving its head into the tray 14, particularly since the forward wall thereof is quite shallow and the tray constructed and offset to place the essential feeding surface thereof clear of the bin. At the same time the fore to aft depth of the tray is definitively limited and the closure element 38 is so positioned and mounted to assure the animal's ease in manipulation thereof with its nose, either initially or at such time the animal requires and calls for a dispensing of a further amount of feed. As will be seen from the drawings, a feature of preferred embodiments of the invention such as illustrated provides that irrespective of the point along the length of tube 38 at which pressure is applied by the feeding animal to clear said outlet, at least in part, it will get substantially equal results as far as the amount of feed dispensed, the maximum being set by the fact as the roller 38 is nudged upwardly it moves up the forward surface of the guide plate 30 and simultaneously therewith moves the plate 42 therewith the projected edge of which at a certain point, quickly reached, will abut the front wall 11 (FIG. 2) and essentially prevent the feeding animal from dispensing any more than a very limited amount of feed each time the dispensing thereof is triggered. It has been found that the animals referred to are quite content with and profit from the controlled diet and good feeding habits which are imposed on them in use of embodiments of this invention for their feeding and development of their diet. Another feature that should be observed is that with the present invention dumping of feed and waste and spoilage thereof is virtually precluded, particularly since at no time will the level of feed in the tray, which may be controlled and vary with appropriate adjustments which should be clearly obvious, reach such a level that a feeding animal will tend to scatter feed. Of course the lateral containment of the animals head using a format of a tray such as illustrated avoids distraction of the animal and psychologically lends to its well being in the comfort provided. Note further that as the tube 38 is moved up guide plate 30 in the dispensing operation it also contributes to maintaining a limitation of the opening of a path for flow of feed through said outlet.

Thus all the objects of the invention previously enumerated and more have been achieved and particular reference is made to the scope of the invention in its embodiment as summarized previously, in that section of this application headed "SUMMARY OF THE INVENTION" and such are here repeated by reference thereto.

From the above description it will be apparent that there is thus provided a device of the character described possessing the particular features of advantage before enumerated as desirable which obviously is susceptible of modification in its form, proportions, detail construction and arrangement of parts without departing from the principle involved or sacrificing any of its advantages.

While, in order to comply with the statute, the invention has been described with reference to particular illustrative embodiments and in language more or less specific as to their structural features and characteristics, it is to be understood that the invention is not limited in execution to the specific features shown or the form or mode of their embodiment illustrated and that the means and construction herein disclosed comprise only a limited sampling of several modes of putting the invention into effect and that the invention is therefore to be comprehended as being in any of its forms or modifications within the legitimate and valid scope of the appended claims.

The embodiments of the invention in which an exclusive property or privilege is claimed are defined as follows:

1. Animal operated self feeder apparatus for use by a sow, boar, pig or like animal, particularly advantageous for use by a farrowing sow, comprising a vertically oriented holding bin having a bottom and a generally tubular wall structure rising upwardly therefrom peripherally bounding and defining its interior, said bin including an inlet for delivery of feed thereto adjacent its top and a feed dispensing outlet having closure means in a normally sealing relation thereto, means within said bin including a pair of vertically displaced, relatively offset and partially overlapped baffle plates defining therewith a plurality of vertically stacked feed holding sections including upper and lower sections an upper of which occupies the majority of the vertical extent of said bin, said baffle plates being respectively connected to respectively opposite wall portions of said bin to each project and incline downwardly from the wall portion to which it connects to substantially bridge the interior of said bin and normally terminate short of an opposite a wall portion of said bin to provide a limited passage thereby at its projected extremity, the upper of said baffle plates defining the lower limit of said upper section and providing a base underlying and bearing essentially the full weight of the load of feed which is delivered to said upper section by way of said inlet to provide numerous feedings for animals, said plates being reversely directed as installed in said bin to provide that such feed as issues from said upper holding section by way of said limited passage at the projected extremity of the upper of said plates deposits on the upper portion of the lower of said plates which provides the base of said lower section and supports and directs the limited amount of feed which deposits thereon to its projected extremity which is in the vicinity of said bin outlet, said closure means and said lower baffle plate being arranged to form part of means which preclude the discharge of more than a very limited amount of feed from said bin by a feeding animal at any given time, the lower of said baffle plates having a hinged connection to that wall portion from which it projects and a portion thereof overlying and bearing on said closure means, a portion of which normally closes the limited passage at the projected extremity of said lower baffle plate, said closure means having a tubular configuration a portion of which normally projects from said outlet as the above mentioned portion thereof closes the limited passage at the projected extremity of said lower baffle plate and means so relating said tubular closure means to said lower baffle plate that in movement thereof by a feeding animal said closure means is constrained to move under and lift said hinged baffle plate the projected extremity of which is normally in close relation to and almost immediately of its lifting abuts the adjacent wall portion of said bin to thereby bridge the transverse extent of the interior of said bin immediately of the bin outlet and interrupt the further dispensing of feed from said bin by a feeding animal.

2. Animal operated self feeder apparatus for use by a sow, boar, pig or like animal, particularly advantageous for use by a farrowing sow, comprising a vertically oriented holding bin having a bottom and a generally tubular wall structure rising upwardly therefrom peripherally bounding and defining its interior, said bin including an inlet for delivery of feed thereto adjacent its top and a feed dispensing outlet in the vicinity of its bottom, means normally bridging and sealing said outlet, said bin having means therein and in connection therewith at a location to provide thereabove the great majority of the vertical extent of its interior to define therein an upper chamber receiving and accommodating what constitutes a load of feed for numerous feedings of animals for an extended period of time, said means and the portion of the bin thereabove providing substantially full support for such feed as is deposited therein, said means providing the lower limit of said upper chamber, being in a substantially bridging relation to the interior of said bin and at one edge portion thereof defining, with an adjacent limited wall portion of said bin, a restricted opening for movement of feed from said upper chamber to means defining a relatively shallow feed holding chamber thereunder and forming the base thereof, said base of said shallow chamber, normally being in a substantially bridging relation to the interior of said bin and being so interrelated to that portion of said means providing the lower limit of said upper chamber adjacent said restricted opening to provide that the movement of feed from said upper chamber to and over said base of said shallow chamber is restricted to a relatively shallow level thereof, said base of said shalllow chamber being in part directly above said bin outlet, means being provided to form with said base of said shallow chamber a bridging of the cross section of said shallow chamber immediately above said outlet, said last named means being accessible to and displaceable by a feeding animal to provide for discharge of feed from said shallow chamber in amounts which are small and quite limited in volume on the occasion of each displacement thereof, said restricted opening from said upper chamber and said dispensing outlet being offset from one another in both a veritcal and horizontal sense and said base of said shallow chamber being provided by a baffle plate which is hingedly connected to what constitutes a rear wall portion of said bin and projected and inclined downwardly therefrom to have its projected extremity normally position in an adjacent closely spaced relation to what constitutes a forward wall portion of said bin and relatively adjacent but spaced above the level of said outlet and said means bridging said outlet normally provides a seal across the space between the projected extremity of said baffle plate and the immediately bounding portion of said bin wall structure subject to a limited displacement thereof under the influence of an animal seeking to dispense feed from said bin by way of said dispensing outlet.

3. An animal operated self feeding apparatus particularly advantageous for use in feeding farrowing sows comprising means defining a substantially vertically oriented feed holding bin having a feed inlet and means defining a feed outlet, means normally providing a closure of said outlet, means interrelated with said closure means to normally define a restricted passage for feed to move to the vicinity of said outlet, a portion of said closure means being accessible for a restricted limited displacement thereof from said outlet by an animal desiring to feed, said means normally defining said restricted passage providing means constructed and arranged to limit the rate of flow of feed from said bin and the feed discharged from said bin to a small amount on the occasion of any effort by an animal to displace said closure means from said outlet, said means interrelated with said closure means being interconnected with said bin and operably related to said closure means to block any passage of feed from said bin in the event the displacement of said closure means from said outlet reaches a predetermined limit.

4. An animal operated self feeding apparatus particularly advantageous for use in feeding farrowing sows comprising means defining a substantially vertically oriented feed holding bin having a feed inlet and means defining a feed outlet, means normally providing a closure of said outlet, means interrelated with said closure means normally defining a restricted passage for feed to move to the vicinity of said outlet, a portion of said closure means being accessible for a restricted limited displacement thereof from said outlet by an animal desiring to feed, said means normally defining said restricted passage providing means constructed and arranged to limit the rate of flow of feed from said bin and the feed discharge from said bin to a small amount on the occasion of any effort by an animal to displace said closure means from said outlet, essentially the vertical extent of said bin being defined a tubular wall structure, said means normally defining a restricted passage for feed to move to the vicinity of said outlet including a plate having a hinged connection to a portion of said tubular wall structure said plate normally being disposed in a substantially bridging relation to said wall structure and interrelated with said closure means to provide that on any displacement of said closure means by a feeding animal said restricted passage is gradually reduced as to its cross section to a point that it is closed on a predetermined limited displacement of said closure means from said outlet.

5. An animal operated self feeding apparatus particularly advantageous for use in feeding farrowing sows including means defining a substantially vertically oriented feed holding bin having a feed inlet and a feed outlet and comprising a front wall, back wall and bridging side wall portions, means forming a base for the feed in said bin including a portion thereof defining said feed outlet, means normally providing a closure of said outlet, means interrelated with said closure means normally defining a restricted passage for feed to move to the vicinity of said outlet, a portion of said closure means being accessible for a restricted limited displacement thereof from said outlet by an animal desiring to feed, said means normally defining said restricted passage including a plate providing means constructed and arranged to limit the rate of flow of feed from said bin and the feed discharged from said bin to a small amount on the occasion of any effort by an animal to displace said closure means from said outlet, said plate being hingedly connected to said back wall portion of said bin and inclining downwardly therefrom to bear on said closure means, and said plate having in an adjacent closely spaced relation thereto means forming a part of said wall structure interrelating therewith on an upward movement thereof in response to a predetermined displacement of said closure means from said outlet to block discharge of feed from said bin by way of said outlet.

6. An animal operated self feeding apparatus particularly advantageous for use in feeding farrowing sows including means defining a substantially vertically oriented feed holding bin having a feed inlet and a feed outlet and comprising a front wall, back wall and bridging side walls and including therein vertically spaced plates, means forming a base for the feed in said bin including a portion thereof defining said feed outlet, means normally providing a closue of said outlet, means interrelated with said closure means normally defining a restricted passage for feed to move to the vicinity of said outlet, a portion of said closure means being accessible for a restricted limited displacement thereof from said outlet by an animal desiring to feed, said means normally defining said restricted passage including one of said vertically spaced plates which provides means constructed and arranged to limit the rate of flow of feed from said bin and the feed discharged from said bin to a small amount on the occasion of any effort by an animal to displace said closure means from said outlet, said one of said plates being the lowermost of said vertically spaced plates which is connected to one of said walls and projects therefrom in downwardly inclined relation thereto to have a portion thereof positioned in an adjacent spaced relation to an opposite wall thereof, said lowermost plate having a pivotally hinged connection to said one of said walls from which it projects and said pivotally hinged plate provides a part of said means normally defining a restricted passage for feed to move to the vicinity of said outlet.

7. Animal operated self feeder apparatus for use by a sow, boar, pig or like animal, particularly advantageous for use by a farrowing sow, comprising a vertically oriented holding bin having a bottom and a generally tubular wall structure rising upwardly therefrom peripherally bounding and defining its interior, said bin including an inlet for delivery of feed thereto adjacent its top and a feed dispensing outlet in the vicinity of its bottom, said wall structure comprising front, back and bridging side walls, the interior transverse cross section of said bin being restricted in that portion thereof immediately of said outlet, which is located immediately of the front wall of said bin, closure means having a tubular configuration a portion of which is normally positioned in a closing relation to said outlet and depends in part through said outlet to be readily accessible to an animal seeking to feed from said bin, means within said bin providing an underlying base support for feed within said bin to move thereon of said outlet, said last named means including a downwardly inclined baffle plate, an upper portion of which is hinged to a portion of the back wall of said bin which is in an upwardly spaced relation to said outlet, said baffle plate projecting downwardly and forwardly from said back wall, in a substantially transversely bridging relation to said bin, to have a portion thereof disposed immediately of and in overlying relation to said closure means in a closely spaced relation to said front wall of the bin to define therewith a limited passage for feed to move from said plate to said normally closed outlet, said baffle plate being interrelated with said closure means to respond to a predeterminable limited displacement of said closure means from said outlet to restrict and block said passage, prevent the further discharge of feed from said bin and produce a closing of said outlet by said closure means.

8. Apparatus as in claim 7 wherein said back wall, at the lower limit thereof is extended by an integrally connected shallow feeding tray the base of which is positioned substantially forward of said front wall portion of said bin and the rear wall and base portion of the tray is a direct extension of the back wall of said bin.

9. An animal operated feeder comprising a vertically extended holding bin having a feed inlet at the top thereof and a dispensing outlet at its bottom, a shallow feeding tray connected with, spaced below and having the major extent thereof projected forwardly of said bottom of said bin, said dispensing outlet being normally bridged and sealed by a closure device, a portion of which projects therethrough, over and in vertically spaced relation to what constitutes a rear portion of said tray, said bin incorporating vertically spaced baffle structure, an upper portion of said baffle structure being in underlying relation to and carrying the major portion of the weight of the feed introduced to said bin by way of said inlet and defining within said bin, at a location offset and vertically displaced from said dispensing outlet, a restricted opening for feed to drop therethrough to a portion of the upper surface of a downwardly inclined baffle plate positioned immediately thereunder, said inclined baffle plate forming part of said baffle structure, said upper surface of said downwardly inclined baffle plate being so constructed and arranged with reference to said upper portion of said baffle structure to direct the limited amount of feed which it receives to initially move as a shallow layer thereof along its upper surface, which extends to the vicinity of said dispensing outlet to have a lower end portion thereof define a limited passage for feed to move thereby to said outlet.

10. An animal operated feeder as in claim 9 wherein said inclined baffle plate is provided by a hinged agitator plate, a dependent portion of which bears on and moves with said closure device to limit its displacement from its sealing relation to the bin outlet and correspondingly limit the amount of feed dispensed in any instance by a feeding animal.

* * * * *

UNITED STATES PATENT AND TRADEMARK OFFICE
CERTIFICATE OF CORRECTION

PATENT NO. : 4,982,698

DATED : Jan. 8, 1991

INVENTOR(S) : Herbert M. Sollars

It is certified that error appears in the above-identified patent and that said Letters Patent is hereby corrected as shown below:

Col. 12, line 20, (Claim 6, line 9) "closue" is corrected to read -- closure --.

line 60, (claim 7, line 19) "of" is corrected to read -- to --.

Signed and Sealed this

Fourth Day of August, 1992

Attest:

DOUGLAS B. COMER

Attesting Officer     Acting Commissioner of Patents and Trademarks